United States Patent
Spears et al.

(12) 
(10) Patent No.: US 6,302,446 B1
(45) Date of Patent: *Oct. 16, 2001

(54) UNION FITTING REPLACEMENT NUT

(75) Inventors: Wayne Spears; Harry Bekeredjian, both of Sylmar, CA (US)

(73) Assignee: Spears Manufacturing Co., Sylmar, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/496,027

(22) Filed: Jan. 24, 2000

(51) Int. Cl.[7] .................................................. F16L 35/00

(52) U.S. Cl. ............................................. 285/33; 411/432

(58) Field of Search ........................ 285/33, 35; 24/279; 411/432, 539, 540

(56) References Cited

U.S. PATENT DOCUMENTS

| | | | |
|---|---|---|---|
| 1,201,022 | * | 10/1916 | Conniff . |
| 2,036,152 | * | 3/1936 | Langman . |
| 3,041,088 | * | 6/1962 | Brandon . |
| 3,471,175 | * | 10/1969 | Newton . |
| 5,277,459 | * | 1/1994 | Braun . |
| 5,816,454 | * | 10/1998 | Odessa . |

* cited by examiner

Primary Examiner—Flemming Saether
(74) Attorney, Agent, or Firm—Sheldon & Mak; Denton L. Anderson

(57) ABSTRACT

A union fitting replacement nut having a nut body and a peripheral strap. The nut body is formed from a pair of C-shaped members. The nut body is internally threaded to cooperate with the external threads of the union fitting to which the union replacement nut is to be installed. The peripheral strap is typically a steel strap having opposed first and second ends. Attachment means, such as an adjustment screw, is provided to incrementally adjust the tightness of the peripheral strap to rigidly retain the two C-shaped members of the nut body. Once assembled, the union replacement nut can be used in the same way as a prior art integral union nut.

16 Claims, 3 Drawing Sheets

UNION FITTING REPLACEMENT NUT

FIELD OF THE INVENTION

This invention relates generally to pipe fittings and, more specifically, to union-type pipe fittings.

BACKGROUND OF THE INVENTION

Union fittings are very useful and popular types of piping fittings. The great advantage of union fittings is that pipe spools and other piping equipment which are connected in a pipe run using union fittings can be "dropped out" of the pipe run without having to cut into the pipe run.

A problem arises with the use of union fittings on those occasions when the union nut falls into disrepair and cannot be reused. This is a frequent occurrence in plastic piping systems, where the union nut threads are fragile and often become stripped.

When the union nut cannot be reused, the union is of no value and must be replaced. This is expensive and time-consuming, even in the best of cases. It is a major problem, however, in plastic piping systems where the union fittings are permanently cemented into the pipe run. In these cases, replacement of the union fitting means having to cut off the old union fitting from the pipe run. Thereafter, completing the replacement of the union fitting within the pipe run entails having to fashion and install a precisely dimensioned pipe spool to replace that portion of the pipe run which has been cut away with the old union fitting.

Accordingly, there is a need for a better method for repairing union fittings after the union nut falls into disrepair. This need is for a method which is easier, less expensive and less time-consuming than present repair methods.

SUMMARY

The invention satisfies this need. The invention is a union replacement nut and a method for using same. The union replacement nut comprises (a) a nut body having a circular shape, an exterior surface an interior surface and an internal diameter, the interior surface having internal threads, the nut body comprising a first Chase member disposed end to end with a second C-shaped member, (b) a peripheral strap having opposed first and second ends, the peripheral strap being disposed around the exterior surface of the nut body, and (c) attachment means for tightly connect the first and second ends of the peripheral strap, so as to rigidly retain the first C-shape member and second the C-shaped member around the nut body.

In a typical embodiment, a pair of C-shaped members are held together by a steel strap, the tightness of which is adjusted by a screw attachment.

The invention provides a strong and durable union replacement unit which functions identically with the original union nut. Use of the union replacement nut does not reduce the pressure rating of the pipe run. The union replacement nut has been found to be a simple, inexpensive device which is quick and easy to install without having to cut into or otherwise refashion the pipe run or any of the piping elements within the pipe run.

DRAWINGS

These features, aspects and advantages of the present invention will become better understood with regard to the following description, appended claims and accompanying figures where:

DETAILED DESCRIPTION

Figure 1:
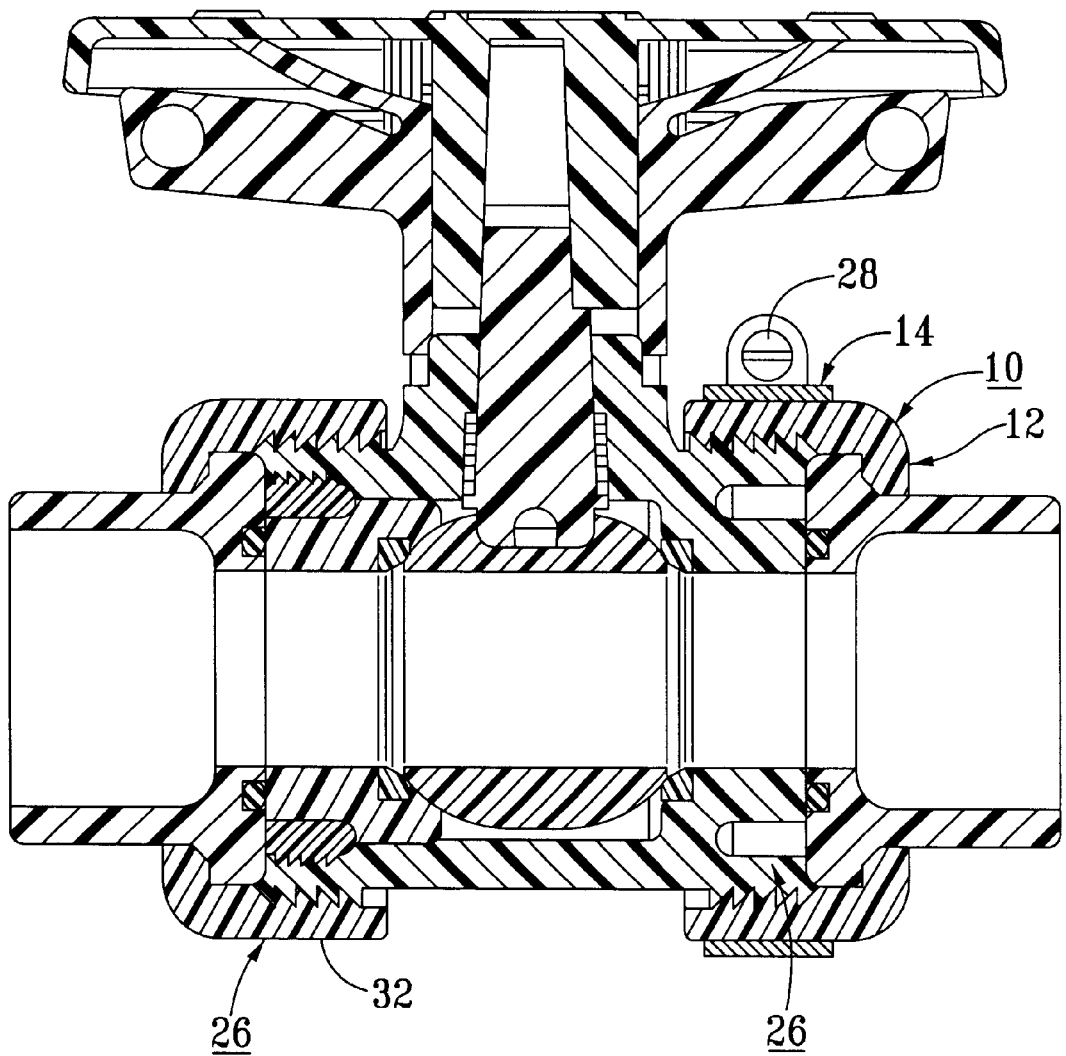
FIG. 1 is a cross-sectional side view of a valve having opposed union fittings, one of the union fittings being shown with a union replacement nut having features of the invention.
Figure 2:
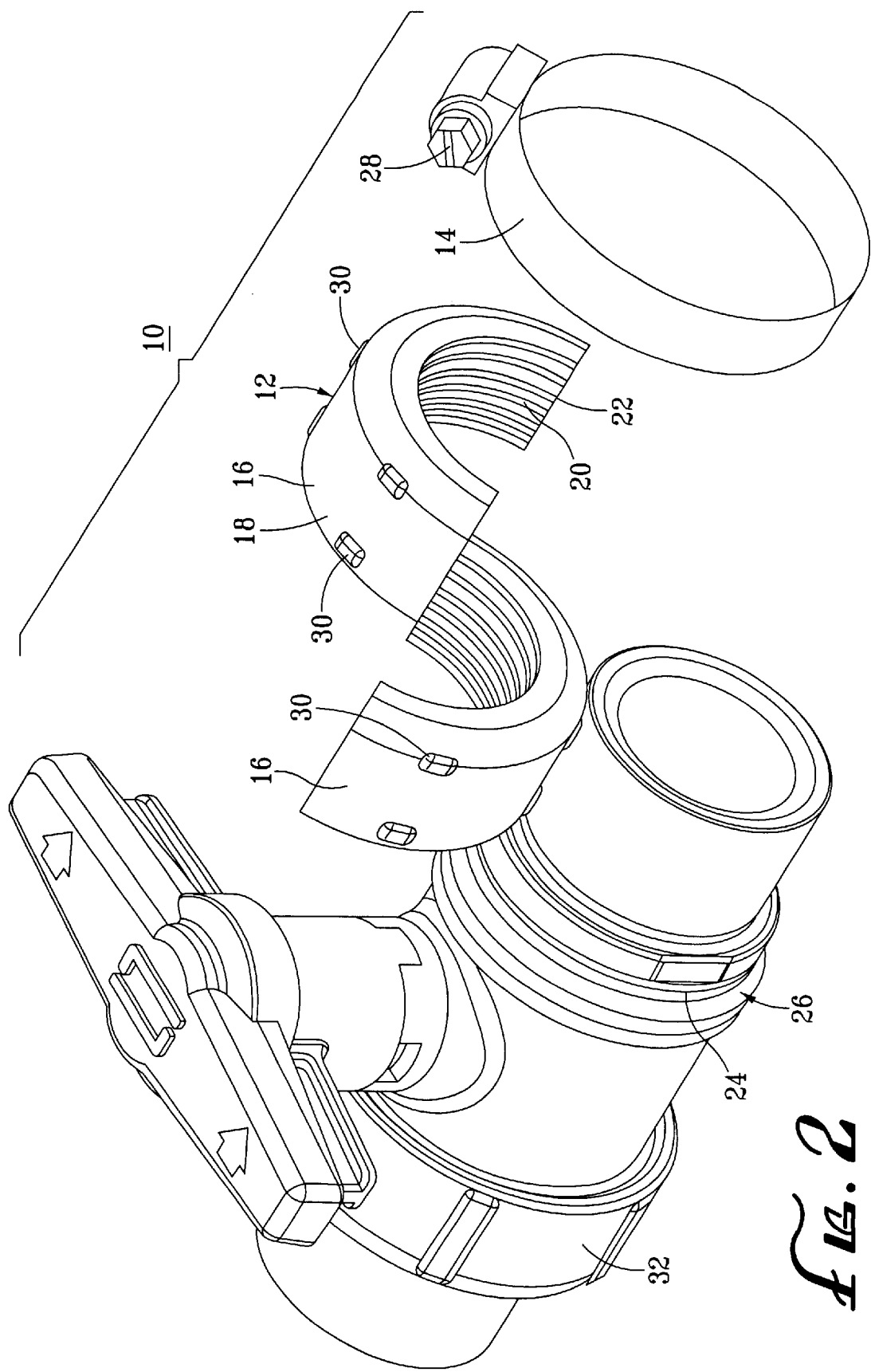
FIG. 2 is a perspective view of a valve having opposed union fittings and showing a union nut replacement kit having features of the invention.
Figure 3:
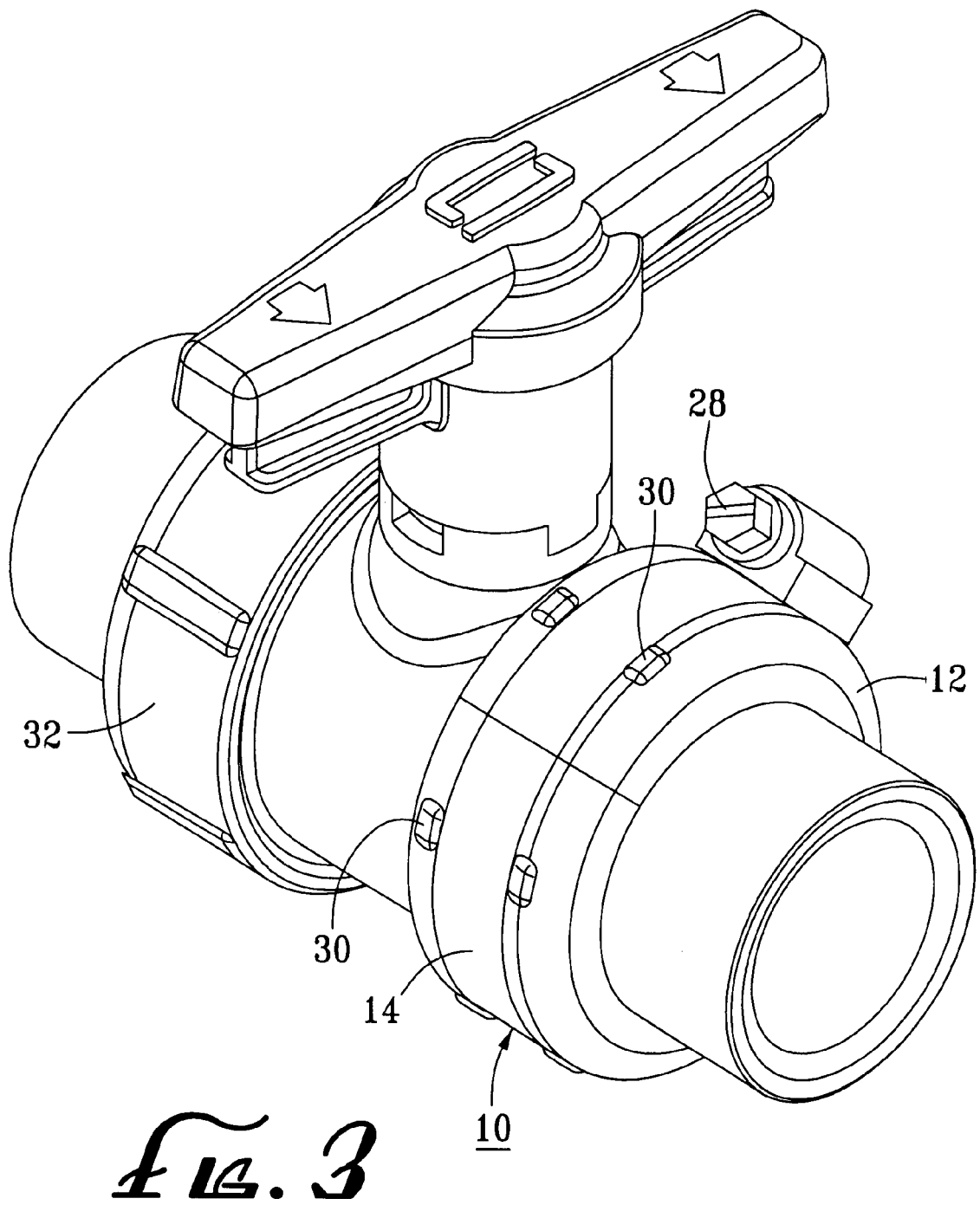
FIG. 3 is a perspective view of the valve shown in FIG. 2, now with the union replacement nut assembled in place on the union fitting.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a union replacement nut 10 comprising a two-part nut body 12 and a peripheral strap 14 disposed about the nut body 12.

The nut body 12 comprises a pair of C-shape members 16 disposed end to end with one another. The two C-shaped members 16 are typically half circular in shape.

The nut body 12 has an exterior surface 18, an interior surface 20 and an internal diameter. The interior surface 20 has internal threads 22 adapted to cooperate with the external threads 24 on a union fitting 26 with which the replacement nut 10 is to be used.

The peripheral strap 14 is typically made from a steel or similar material with a high tensile strength. Where the peripheral strap 14 is made from a steel, the thickness of the peripheral strap 14 is typically between about 0.005" and about 0.250".

The peripheral strap 14 has opposed first and second ends and attachment means for tightly connecting the first and second ends. Preferably, the attachment means is capable of incrementally drawing the first and second ends of the peripheral strap 14 towards one another. In the drawings, such an attachment means is provided by an adjustment screw 28, the rotation of which incrementally draws the first and second ends of the peripheral strap 14 towards one another.

It is also preferable that the exterior surface 18 of the nut body 12 have a plurality of spaced-apart centering members 30 which maintain the peripheral strap 14 about the center of the nut body 12.

In operation, a union nut 32 which has fallen into disrepair is removed from the union fitting 26 and slid away from the union fitting 26 along the pipe run. A union replacement nut kit comprising a two-part nut body 12, a peripheral strap 14 and an attachment means is then assembled to form a union replacement nut 10 around the union fitting 26. In assembling the union replacement nut 10, the two halves 16 of the nut body 12 are disposed around the union fitting 26. Then the peripheral strap 14 is slipped over the two halves 16 of the nut body 10 and tightened down using the attachment means (such as by turning the adjustment screw 28 in the embodiment illustrated in the drawings). The peripheral strap 14 is tightened until the nut body 12 is held firmly together as a single, rigid unit. Thereafter, the replacement nut 10 is used with the union fitting 26 in the same way that the original union nut 32 was used to tighten the union fitting 26 within the pipe run. The use of the replacement nut 10 generally does not affect the pressure rating of the pipe run.

As noted above, the invention has been found to be a simple, easy to install and inexpensive device for replacing a broken union nut without having to cut into or otherwise re-fashion the pipe run or any of the elements within the pipe run.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A union replacement nut comprising:
   (a) a nut body having a circular shape, an exterior surface, an interior surface and an internal diameter, the interior surface having internal threads, wherein the nut body has a plurality of raised, spaced-apart centering members disposed radially about the exterior surface, the nut body comprising a first C-shaped member disposed end to end with a second C-shaped member;
   (b) a peripheral strap having opposed first and second ends, the peripheral strap being disposed around the exterior surface of the nut body; and
   (c) attachment means for tightly connecting the first and second ends of the peripheral strap, so as to rigidly retain the first C-shaped member and second the C-shaped member around the nut body;
      wherein the peripheral strap is disposed between the spaced-apart members to retain the first C-shaped member and the second C-shaped member end to end such that the internal threads are substantially in alignment.

2. The union replacement nut of claim 1 wherein the shape of both the first C-shaped member and the second C-shaped member is a half circle.

3. The union replacement nut of claim 1 wherein the peripheral strap is made from steel.

4. The union replacement nut of claim 3 wherein the peripheral strap has a thickness between about 0.005" and about 0.250".

5. The union replacement nut of claim 1 wherein the attachment means is capable of incrementally drawing the first and second ends of the peripheral strap towards one another.

6. The union replacement nut of claim 1 wherein the attachment means comprises an adjustment screw, the rotation of which incrementally draws the first and second ends of the peripheral strap towards one another.

7. The union replacement nut of claim 1 further comprising a plurality of centering members disposed about the exterior surface of the nut body.

8. The union replacement nut of claim 1 wherein the internal threads of the interior surface are adapted to cooperate with external threads on a union fitting.

9. A union replacement nut comprising:
   (a) a nut body having a circular shape, an exterior surface, an interior surface and an internal diameter, the interior surface having internal threads, wherein the nut body has a plurality of raised, spaced-apart centering members disposed radially about the exterior surface, the nut body comprising a first C-shaped member disposed end to end with a second C-shaped member, both the first and second C-shaped members being half circular in shape;
   (b) a peripheral strap having opposed first and second ends, the peripheral strap being made of steel, the peripheral strap being disposed around the exterior surface of the nut body; and
   (c) attachment means for tightly connecting the first and second ends of a peripheral strap, so as to rigidly retain the first C-shaped member and the second C-shaped member around the nut body, the attachment means comprising a screw, the rotation of which incrementally draws the first and second ends of the peripheral strap towards one another;
      wherein the peripheral strap is disposed between the spaced-apart members to retain the first C-shaped member and the second C-shaped member end to end such that the internal threads are substantially in alignment.

10. A kit comprising:
    (a) a nut body having a circular shape, an exterior surface, an interior surface and an internal diameter, the interior surface having internal threads, wherein the nut body has a plurality of raised, spaced-apart centering members disposed radially about the exterior surface, the nut body comprising a first C-shaped member disposed end to end with a second C-shaped member;
    (b) a peripheral strap having opposed first and second ends, the peripheral strap being disposable around the exterior surface of the nut body; and
    (c) attachment means for tightly connecting the first and second ends of the peripheral strap, so as to be able to rigidly retain the first C-shaped member and second the C-shaped member around the nut body;
       wherein the peripheral strap is capable of being disposed between the spaced-apart members to retain the first C-shaped member and the second C-shaped member end to end such that the internal threads are substantially in alignment.

11. The kit of claim 10 wherein the shape of both the first C-shaped member and the second C-shaped member is a half circle.

12. The kit of claim 10 wherein the peripheral strap is made from steel.

13. The kit of claim 10 wherein the peripheral strap has a thickness between about 0.005" and about 0.250".

14. The kit of claim 10 wherein the attachment means is capable of incrementally drawing the first and second ends of the peripheral strap towards one another.

15. The kit of claim 10 wherein the attachment means comprises an adjustment screw, the rotation of which incrementally draws the first and second ends of the peripheral strap towards one another.

16. The kit of claim 10 further comprising a plurality of centering members disposed about the exterior surface of the nut body.

* * * * *